United States Patent
Maurer et al.

(10) Patent No.: US 8,396,285 B2
(45) Date of Patent: Mar. 12, 2013

(54) ESTIMATING VANISHING POINTS IN IMAGES

(75) Inventors: Ron Maurer, Haifa (IL); Hadas Kogan, Zichron Yaacov (IL); Renato Keshet, Haifa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 930 days.

(21) Appl. No.: 12/426,386

(22) Filed: Apr. 20, 2009

(65) Prior Publication Data

US 2010/0266212 A1    Oct. 21, 2010

(51) Int. Cl.
*G06K 9/36* (2006.01)
(52) U.S. Cl. ...................................... 382/154
(58) Field of Classification Search ................ None
See application file for complete search history.

(56) References Cited

U.S. PATENT DOCUMENTS

| | | | |
|---|---|---|---|
| 7,209,832 B2* | 4/2007 | Yamamoto et al. | 701/301 |
| 2009/0034799 A1* | 2/2009 | Nishida et al. | 382/104 |
| 2010/0079453 A1* | 4/2010 | Chen et al. | 345/421 |
| 2010/0322476 A1* | 12/2010 | Kanhere et al. | 382/103 |

OTHER PUBLICATIONS

Frederik Schaffalitzky et al., "Planar Grouping for Automatic Detection of Vanishing Lines and Points," Image and Vision Computing, vol. 18, pp. 647-658 (2000).
Christopher R. Dance, "Perspective Estimation for Document Images," Proceedings of SPIE vol. 4670 (2002).
Fred Stentiford, "Attention-Based Vanishing Point Detection," ICIP 2006.
Kyung-Seok Seo et al., "The Efficient Detection of Vanishing Points Using Inverted Coordinates Image Space," CISST 2004: 145-150.

* cited by examiner

*Primary Examiner* — Brian P Werner

(57) ABSTRACT

A digital image is processed to provide an estimation of the position in the image plane of a vanishing point. The processing includes detecting pairs of similar image patches and identifying a concurrent set of straight virtual lines that substantially converge at a point on the image plane, each line passing through a pair of similar image patches within the image.

23 Claims, 10 Drawing Sheets

ESTIMATING VANISHING POINTS IN IMAGES

FIELD

The present invention is in the field of automated image understanding and relates in particular to estimating the location of a vanishing point in a digitized image.

BACKGROUND

The field of digital image editing, manipulation, and enhancement is evolving to contain three-dimensional (3D) scene structure understanding. Under a pinhole camera model, a set of parallel lines in a 3D scene is projected to a set of concurrent lines which meet at a single point, known as a vanishing point (VP). Each VP is associated with a unique 3D orientation, and hence can provide valuable information on the 3D structure of the scene. VPs are used for a variety of vision tasks such as camera calibration, perspective rectification, scene reconstruction and more. For example, knowledge of the location of a VP is required in applications such as reliably planting objects in images uploaded via the internet: where 'reliably' typically means ensuring accurate scaling. Techniques for determining VPs in images are well-known and typically rely on finding straight lines in the images, and projecting those lines to find locations, on the image plane, where the projected lines intersect. Intersections may be within the image area or outside of the image area, depending on the nature of the image. Known techniques can fail in a variety of cases where straight features are either not present or are too faint or blurred to be detected credibly. In addition, the accuracy and credibility of current VP estimation methods can deteriorate quickly in relatively low resolution images, due to feature blurring and line digitization artifacts. Finally, the computational complexity of existing techniques is relatively high and scales not only with image size but also with the density of straight line segments in the image. Hence it is hard to design a general solution with a good control of the trade-off between estimation accuracy and speed.

SUMMARY

According to a first aspect, the present invention provides an automated method of estimating the position of a vanishing point in an image plane of a digital image, including by detecting pairs of similar image patches within an image and identifying a concurrent set of straight virtual lines that substantially converge at a point on the image plane, each line passing through a pair of similar image patches within the image.

According to a second aspect, the present invention provides an image processor comprising: an input to receive digital data representing a digital image; a data store to store a received digital image; and a vanishing point estimator, which is adapted to estimate the position of a vanishing point in an image plane of a digital image, including by detecting pairs of similar image patches within an image and identifying a concurrent set of straight virtual lines that substantially converge at a point on the image plane, each line passing through a pair of similar image patches within the image.

According to a third embodiment, the present invention provides an automated method of processing an image by estimating the position of a vanishing point in an image plane of a respective original digital image, including by detecting pairs of similar image patches within an image and identifying a concurrent set of straight virtual lines that substantially converge at a point on the image plane, each line passing through a pair of similar image patches within the image.

Other aspects and embodiments of the invention will become apparent from the following description, claims and drawings.

BRIEF DESCRIPTION OF THE DRAWINGS

Various features and advantages of the invention will become apparent from the following description of embodiments of the invention, given by way of example only, which is made with reference to the accompanying drawings, of which:

FIG. 5a is a digital image of a room and FIG. 5b is the result of applying a Laplacian of Gaussian filter to the digital image of FIG. 5a;

FIG. 7 is a SCORE matrix generated according to an embodiment of the present invention on the basis of the image strips illustrated in FIG. 6a;

FIG. 9 illustrates two vanishing points determined according to an embodiment of the present invention for the image of FIG. 5a;

DETAILED DESCRIPTION

Figure 1:
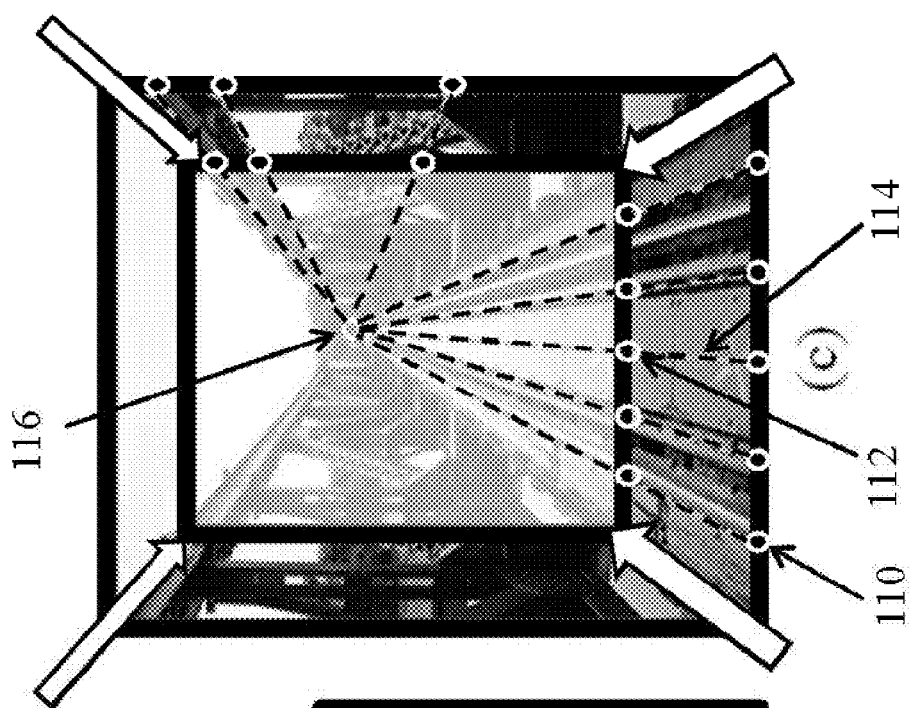
FIG. 1 is a sequence of images that illustrate vanishing point estimation using the principle of global self-similarity.
Figure 1:
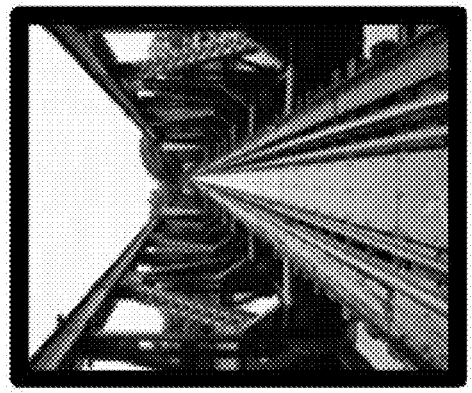
Figure 1:
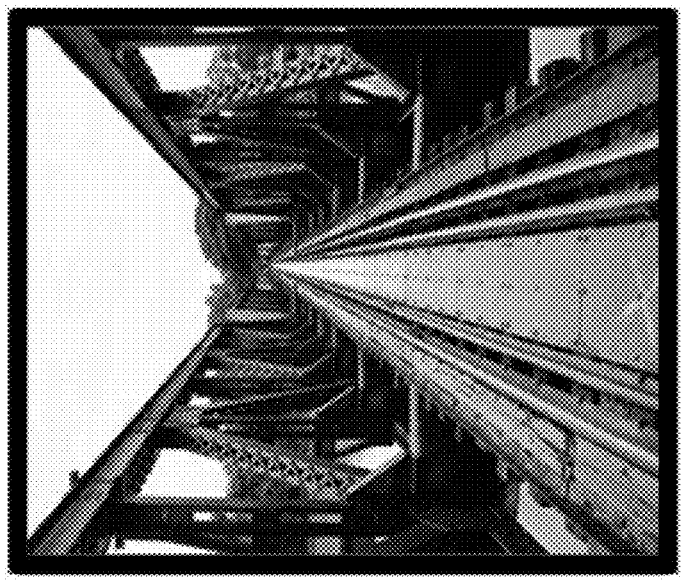

Various embodiments of the present invention will now be described in more detail with reference to the accompanying drawings. It will be appreciated that the invention is not limited in its application to the details of method and the arrangement of components as set forth in the following description or illustrated in the drawings. It will be apparent to a person skilled in the art that additional embodiments of the present invention not detailed in the description are possible and will fall within the scope of the present claims. Accordingly, the following description should not be interpreted as limiting in any way, and the scope of protection is defined solely by the claims appended hereto.

A principle employed for determining VPs in images according to embodiments of the present invention is illustrated in FIGS. 1a, 1b and 1c. The image in FIG. 1a is of a railway track extending directly away from the viewer, so that a VP exists within the image area on the image plane. The image in FIG. 1b is a downscaled version of the image in FIG. 1a, and the image in FIG. 1c shows a superposition of FIG. 1b over FIG. 1a. As can be appreciated from FIG. 1c, the image exhibits a global self-similarity property, which can be used to estimate the VP. In effect, the same VP prediction can be obtained from matching pairs of image patches of the original image (FIG. 1a) and the downscaled image (FIG. 1b). In this context, image patches are small neighbourhoods of pixels around a pixel of interest. This is illustrated in FIG. 1c by white circles 110 on the boundary of the outer image and white circles 112 on the boundary of the inset downscaled image, each pair thereof being joined by a projection line 114 which crosses with the other projection lines at the VP. Furthermore, the VP prediction can be obtained in a more credible fashion by simultaneously matching two sets of image patch pairs, each set lying on 1D cross-sections (or profiles) of the original image (FIG. 1a) and the downscaled image (FIG. 1b) that are parallel to each other. For example, the intensity profiles in the bottom and right boundaries of the original image in FIG. 1a, are approximately similar, up to downscaling and translation (1D-affine), to the corresponding boundary profiles of the downscaled image in FIG. 1b. In the present context, two image contexts are similar if they possess similar values of a feature set, where the feature set can include, for example, colour, texture, their gradients or any other appearance characteristic as needed for a respective application.

The arrows connecting the ends of the matching profiles (respective image corners) point towards, and meet at the VP. In other words, the VP position can be extracted from 1D-affine matching between a pair of parallel 1D-profiles. In other words, it can be appreciated that a set of straight virtual lines that connect pairs of matching image patches (white circles) are concurrent and converge at the VP. As used herein, the term 'virtual line' is a line constructed or projected through matching (or similar) patches in an image. A virtual line may coincide with a true straight line in the image but, equally (as will be described in detail below), may not coincide with any discernable line, straight edge or linear feature in the image. In effect, the process of obtaining a single VP from a global 2D self-similarity can be viewed as equivalent to clustering a large collection of VP candidates, each obtained from either meeting point of virtual lines connecting matching points as described above, or equivalently obtained by 1D-affine similarity between a pair of parallel 1D image profiles. Following this view, it is possible to generalize a self similarity approach for detecting multiple VPs located anywhere in an image plane; even when the VPs are not within the image area. Embodiments of the present invention employ this principle, as will be described below.

Figure 2:
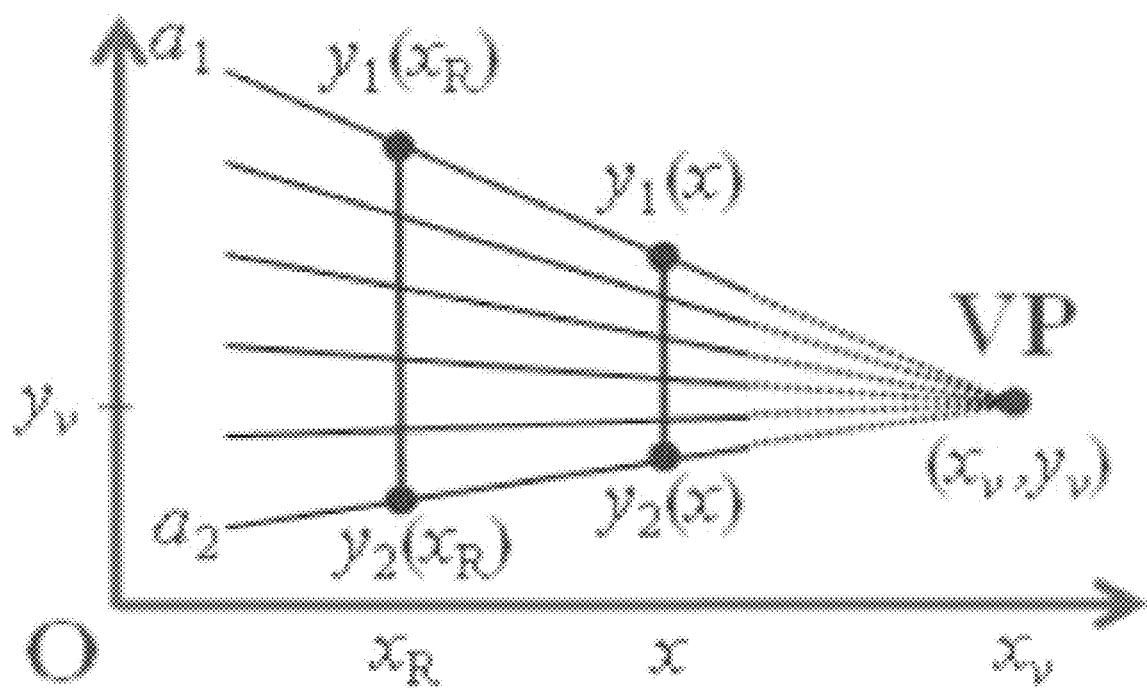
FIG. 2 is a graph illustrating a 'pencil' applied according to embodiments of the present invention.

With reference to the diagram in FIG. 2, a point is defined by K (real or virtual) line segments with finite slopes $a_k$ (k=1 . . . K) that converge at a common vanishing point VP=$(x_v, y_v)$. Following a mathematical nomenclature, this structure is referred to herein as a 'pencil'. A vertical cross-section of the pencil at some horizontal position x crosses the pencil lines at the points with y-coordinates $$y_k(x) = y_v + a_k(x - x_v).$$

All such cross-sections are similar up to scaling with respect to the VP. In particular the relation between two cross sections at x and $x_R$ respectively is:

$$\forall k: \frac{y_k(x_R) - y_v}{y_k(x) - y_v} = \frac{x_R - x_v}{x - x_v} \equiv s_{[x_R, x]}. \tag{1}$$

From the general scaling similarity relation of (1), it is possible to estimate the location of the VP as follows. Equation (1) can be expressed as an affine similarity relation relative to the origin:

$$\forall k: y_k(x_R) = s_{[x_R, x]} y_k(x) + \tau_{[x_R, x]} \tag{2}$$

$$\tau_{[x_R, x]} = y_v(1 - s_{[x_R, x]}). \tag{3}$$

If the affine transformation parameters (s, τ) are found between a matching pair of cross sections at $x_R$, x, the pencil's VP can be determined as:

$$x_v = x_R + \frac{x - x_R}{1 - s_{[x_R, x]}}, \quad y_v = \frac{\tau_{[x_R, x]}}{1 - s_{[x_R, x]}} \tag{4}$$

In practice each matching pair of cross-sections (x, $x_R$) produces a VP candidate. As these candidates are based on information from an entire pencil (collection of many real or virtual lines) they are considerably more credible than traditional VP candidates corresponding to meeting points of line pairs. Hence, there tend to be fewer "false alarms" (i.e. misplaced VP candidates). Given a collection of VP candidates (regardless of how they are obtained), the VPs can be estimated by candidate accumulation and clustering. Since in typical man-made scenes many VPs lie far away from the image boundaries, or at infinity, the candidate accumulation step cannot work in regular spatial coordinates, since VPs at infinity or at a large distance from the image boundaries would not be handled properly. There are suitable accumulation spaces used in the literature, such as Gaussian sphere representation. However, they typically depend on camera calibration parameters, such as the focal length, which would not always be available, for example, for images downloaded from the Internet. One feature of embodiments of the present invention is a new pencil-based accumulator space, that is designed to deal with distant VPs, and is, very conveniently, independent of camera calibration. First, from Equations (1) and (3) it can be established that transformation parameters relating a fixed reference cross-section at $x_R$ to another cross section at x is a linear function of x. Hence the rate of change in the affine matching parameters $a_s \equiv \partial_x s$, $a_\tau \equiv \partial_x \tau$ is fixed. The parameter pair $a_s$, $a_\tau$, can be denoted as the pencil slope. The pencil slope has an invertible relation to the VP coordinates $(x_v, y_v)$, and can be computed directly from the transformation parameters of a single cross-section match:

$$a_s(x_R) = \frac{1}{x_R - x_v} = \frac{s_{[x_R, x]} - 1}{x - x_R} \tag{5}$$

$$a_\tau(x_R) = \frac{-y_v}{x_R - x_v} = \frac{\tau_{[x_R, x]}}{x - x_R} \tag{6}$$

Since different matched cross-section pairs may have different reference positions $x_R$, the pencil slopes can be transformed to a common reference position $x_o$, for example the image centre. From equations (5) and (6) the following transformation rule is obtained:

$$[a_s(x_o), a_\tau(x_o)] = \frac{[a_s(x_R), a_\tau(x_R)]}{1 + a_s(x_R)(x_o - x_R)}. \tag{7}$$

In this parameterization, infinite vanishing points are mapped to $$[a_s(x_o), a_\tau(x_o)] = (0, \tan \theta_v),$$

where $\theta_v$ is the VP direction. The main limitation of the pencil slope parameterization is that VPs at $x_o$ are mapped to infinity. This limitation can be resolved by employing two different parameterizations: a first search for VPs located inside the image, in bounded image space $(x_v, y_v)$; and a second search for VPs located outside the image in pencil slope space with $x_o$ taken at the image centre.

The derivation described thus far can be applied to cross-sections having arbitrary orientations. In practice, plural sets of cross sections at different orientations are required in order to reliably establish all VPs for an image, as pencils cannot be detected if their lines are substantially parallel to the orientation of a cross section set. For example, as will be applied according to an embodiment of the present invention below, in most practical cases, two perpendicular cross section orientations can be used to detect VPs located at all orientations.

While any cross section orientation can be used, it is a fact that most scenes having man-made objects or edifices contain a significant number of horizontal and vertical surfaces. In addition, images of such scenes tend to be photographed with the optical axis of the camera essentially parallel to the horizontal support surface (for example the ground or floor) or to a distant horizon. Under these conditions, substantially vertical and horizontal cross sections are generally well suited for detecting pencils of real or virtual lines. In addition, these orientations are most compatible with the image pixel grid of a digitized image, so that accuracy reduction due to aliasing tends to be minimal.

Figure 3:
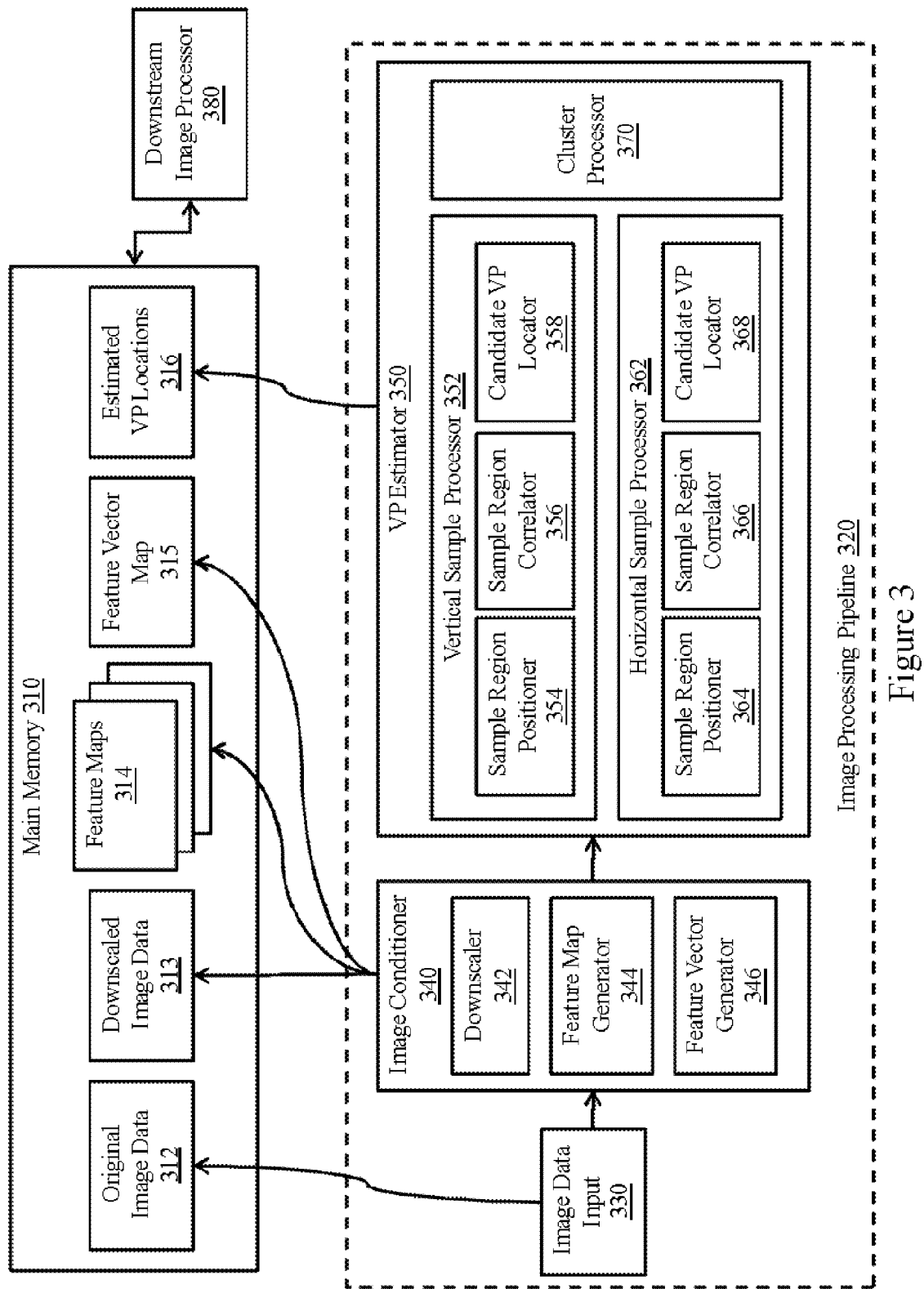
FIG. 3 is a functional block diagram of an imaging pipeline according to an embodiment of the present invention.

An embodiment of the present invention can be implemented using an image processing system 300, as illustrated in the functional block diagram in FIG. 3. The system 300 comprises an image processing pipeline 320 and data store comprising main memory 310. The main memory 310 typically comprises RAM, for storing image data, data structures and variables employed in the various image processing operations, as will be described. The image processing pipeline 320 comprises an image data input 330, for receiving image data to be processed, an image conditioner 340, for preparing the image data for VP estimation processes, and a VP estimator 350, for estimating the location of one or more VPs in the image plane of the image.

The image conditioner 340 comprises a number of processing components that are optional in the context of embodiments of the present invention. That is, other embodiments of the invention may not apply image conditioning, and VP estimation would then be carried out on raw image data. However, according to the present embodiment, image conditioning is applied in order to make VP estimation faster (in image processing efficiency terms) and in some cases more reliable. The kind of image conditioning that is applied (if any) can be varied according to the kind of image being processed, and the skilled person, on reading the present description, would be able to apply any image conditioning deemed appropriate.

The image conditioner 340 comprises a downscaler 342, for downscaling an image to a lower resolution, a feature map generator 344, for generating a feature map of the image, and a feature vector generator 346, for generating a feature vector of each pixel, where the feature vector for a pixel characterizes the image patch consisting of a neighbourhood of pixels around the respective pixel. The operation of feature map generator 344 and the feature vector generator 346 will be described in detail below. The VP estimator 350 comprises a vertical image strip processor 352, for determining VPs from vertical image strips, and a horizontal image strip processor 362, for determining VPs from horizontal image strips. The presence of both vertical and horizontal image strip processors fulfills the preference to analyze at least two orientations (though, other orientations could instead be analyzed).

The term "image strip" is used herein synonymously with 'cross section', in the context of a relatively narrow (but not infinitely so), elongated region in an image. As will be described, pairs of parallel image strips are used, according to one implementation of the present invention, to establish the position of candidate VPs in an image. It will be appreciated that use of image strips as such is not essential: in the alternative all regions of the image could be analyzed (i.e. not just image strips). However, as will become apparent, using image strips provides a significantly more efficient process.

Each of the vertical and horizontal image strip processor comprise an image strip positioner, 354 & 364, for positioning image strips on the image, an image strip correlator, 356 & 366, for comparing image patches that are sub-regions of the image strips and establishing similar image patches and a candidate VP locator, 358 & 368, for establishing from all matching image patches the candidate VP location. The cluster processor 370 uses the positions on the image plane potential VP locations to determine the positions of the VPs for the image.

All (or at least some of the) processing elements of FIG. 3 can be implemented in hardware circuits, firmware, or as software routines that are loaded from a storage device (for example a hard disk of a computer system) into program memory and executed by a programmable processor. The invention is in no way limited to implementation in hardware, software, a combination thereof or by any other processing means. In the present example, the processing is carried out by software executing on a standard personal computer, for example operating under a Windows™ operating system.

An embodiment of the present invention consisting of processing an image to determine its vanishing point or points will now be described with reference to the flow diagram in FIG. 4.

First [step 400] the image data input 330 receives original image data 312 and stores it in the main memory 310.

Figure 5A:

An exemplary image comprising a scene of an unlit, empty room with daylight shining through a window and reflecting on the floor on the left hand side of the image, is shown in FIG. 5a. As already indicated, while embodiments of the present invention can operate on original images of this kind, the performance of the procedure can be improved by conditioning the image in various optional ways.

In terms of image conditioning, next [step 405], the downscaler 342 reduces the resolution of the original image from (in this example) 1500×1000 pixels to 75×50, using well known procedures, such as bilinear interpolation, to produce downscaled image data 313, which is stored in main memory 310. According to the present embodiment, the aspect ratio of the original image is preserved in the down-scaled image. Reduction of the resolution of an image to be analyzed reduces processing overhead and increases processing speed. Although a significant reduction in resolution can lead to a small loss of VP estimation accuracy, results are still accurate enough for most purposes. It has been found by experiment that horizontal or vertical resolutions as low as 50 pixels, but preferably exceeding 70 pixels and more preferably exceeding 100 pixels, can provide sufficient results for some applications.

The feature map generator 344 then [step 410] generates a collection of feature maps 314, each being stored in main memory 310, by operating on the downscaled image data 313. In the flow diagram only three feature map generating steps are shown, but there may be more or fewer, or indeed only one. Each feature map 314 assigns a single value to each pixel, characterizing some properties of the colour or intensity distribution around the pixel. According to the present embodiment, the feature maps are preferably designed to be insensitive to slow illumination changes and noise. In practical terms, the process will work with only a single feature map being generated. However, multiple maps, generated in differing ways, can lead to more accurate VP estimation. Then [step 415], for each image point (c, r), the values of all feature maps in a small spatial context (patch) around that pixel are collected into a feature vector $V_{c,r}$, by the feature vector generator 346. The assembly of all the feature vectors—one for each image pixel—forms the "feature vector map" data 315, which is stored in main memory 310.

Figure 5B:

According to the present embodiment, an exemplary feature map 314 is generated using a Laplacian of Gaussian (LoG) filter on the luminance channel of the downscaled image data 313. The LoG filter is well known and typically used for edge detection in image processing applications. The output of an exemplary LoG filter operation on the image in FIG. 5a is illustrated in the image in FIG. 5b. As can be seen in FIG. 5b, the LoG filter substantially removes the low frequencies (slow illumination changes) of the image and leaves only the high frequencies (edges). The spatial context for the feature vectors depends on the pencil orientation that is being analyzed (e.g. horizontal or vertical), and on the resolution of the modified image. For example, according to the present embodiment, for horizontal pencil analysis, the shape of the context is a vertical rectangle centered around the pixel of interest (conveniently with odd width and height), where the width is small enough for a valid 1D approximation, but not too small to keep the context informative so as to avoid a high rate of false matches. For very low resolution (image height less than 100 pixels), a context width of three pixels was found to provide this good compromise. Wider contexts may strike a better compromise for higher resolutions of the modified image. A good compromise for the context height is roughly twice the context width (for example, five pixels in the case of very low resolution).

Figure 6:
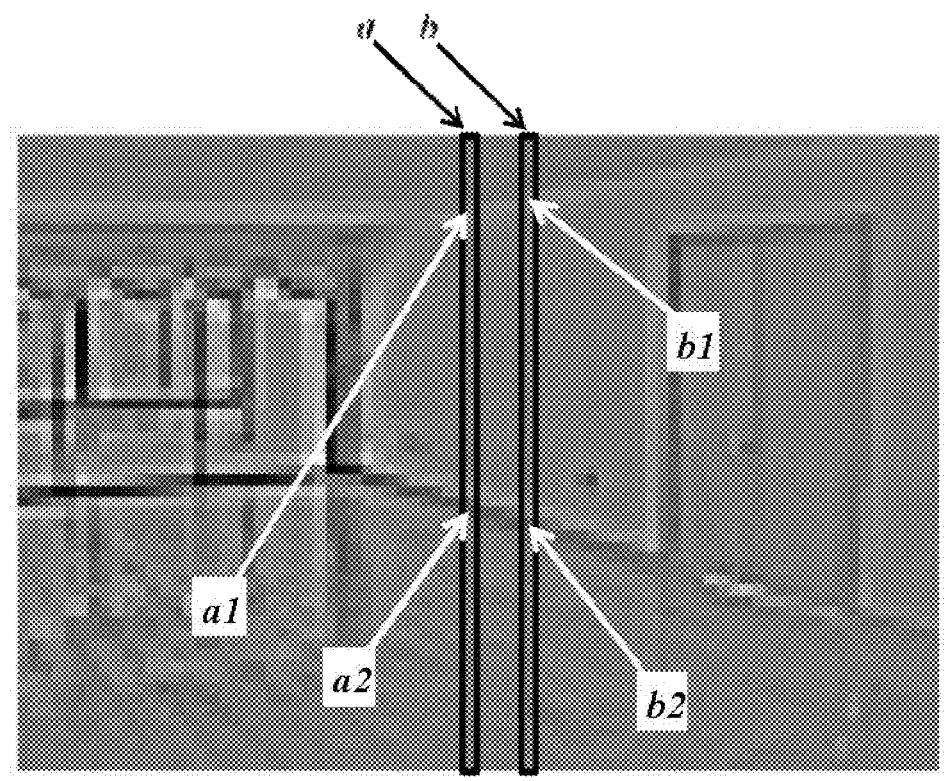
FIG. 6 is the same image as in FIG. 5b including two exemplary image strips according to an embodiment of the present invention.

After the image has been conditioned to produce a feature vector map 315, the next stage is to find at least one pair (and preferably more pairs) of image strips (i.e. cross sections) that have matching patches (sub-regions). Taking the vertical image strip processor 352 first, according to the present embodiment, image strips correspond to parallel, elongated, vertical columns of the feature vector map, that encapsulate information from a vertical strip of the conditioned image. For example regions a and b as illustrated in the image in FIG. 6, each of which are the width of a single feature vector column.

Figure 4:
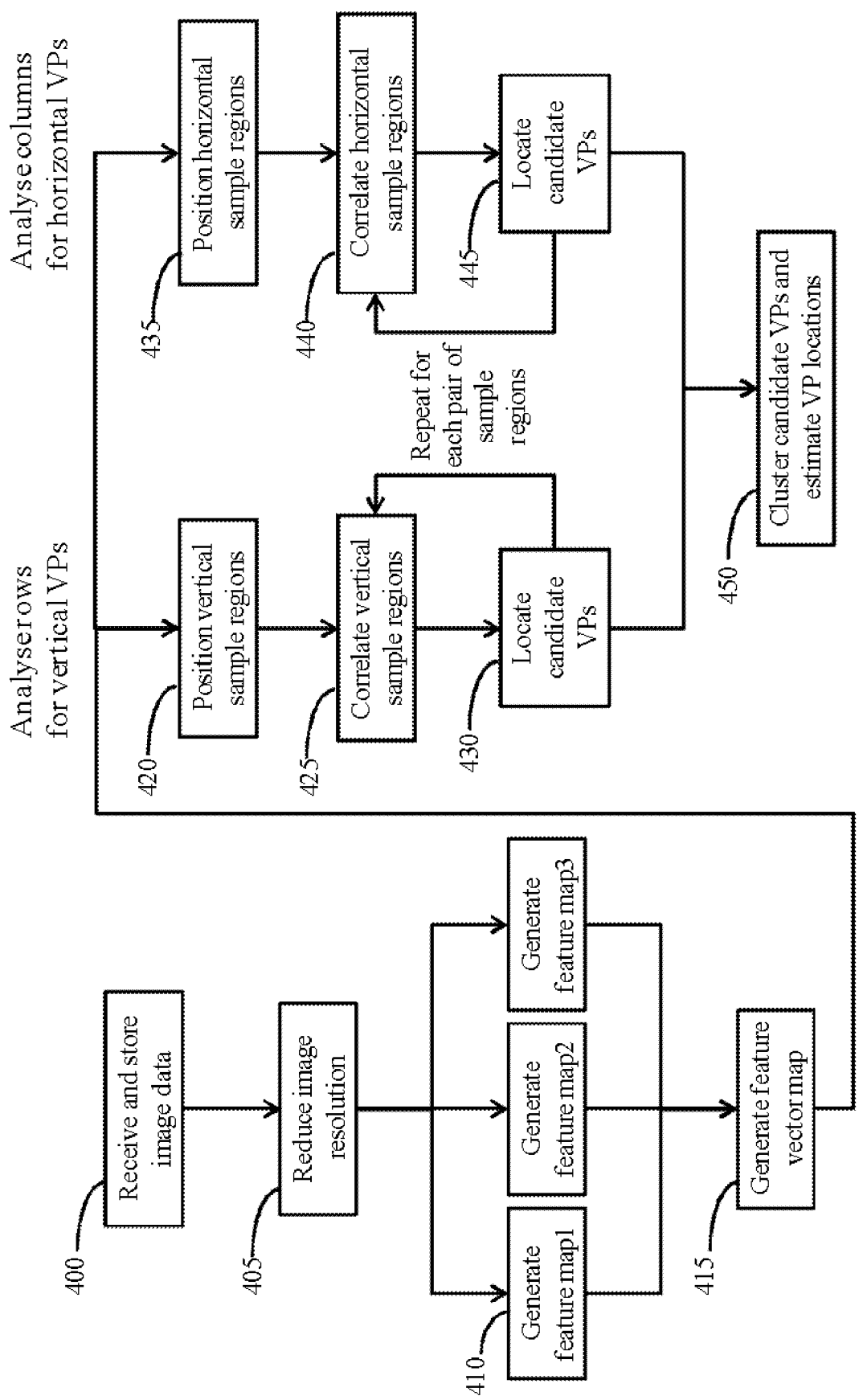
FIG. 4 is a graph representing an image processing process according to an embodiment of the present invention.

According to the flow diagram in FIG. 4, [step 420] the image strip positioner 354 then determines the position of a number of evenly-spaced image strips over the modified image. In this instance, 20 image strips (not shown) are evenly spaced over the modified image. Then [step 425] the image strip correlator 356 selects pairs of neighbouring image strips and compares the image strips to test the similarity of the image patches that occur in both image strips.

Figure 7:
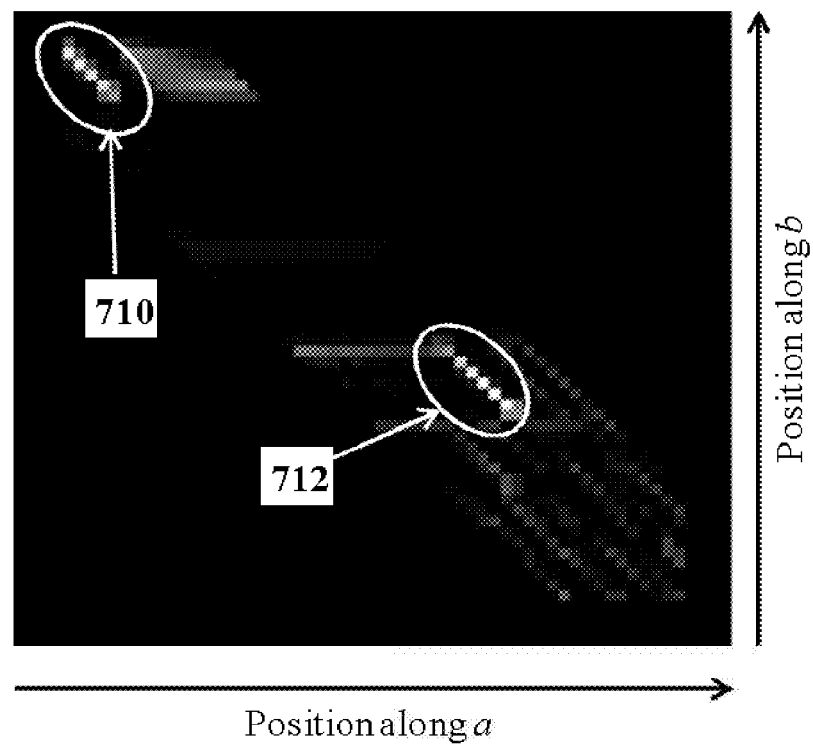

According to the present embodiment, an image strip correlation procedure first creates a similarity map, referred to herein as a Structural CORrelation Evidence ('SCORE') matrix, as illustrated in the diagram in FIG. 7, between the two image strips. Then, similarity transformation parameters are estimated directly from the SCORE matrix. From the similarity transformation, a candidate VP can then be estimated directly from the similarity, as described above with reference to FIG. 2. In principle, it is necessary to find a global affine match that is consistent with the majority of the perceptually significant point-matches, but is not affected by mis-matches due to occlusions. According to the present embodiment, a new perceptual matching criterion is introduced that favours visually significant matches (positive evidence), while effectively ignoring visually insignificant matches (little evidence) and mismatches (negative evidence). The form of SCORE is related to the known Structural Similarity ("SSIM") perceptual error-measure, as described in Z. Wang, A. Bovik, H. Sheikh, and E. Simoncelli, "Image quality assessment: From error visibility to structural similarity", IEEE Transactions on Image Processing, 13(4):600-612, April 2004.

The SCORE value of a pair of feature vectors $v_1$, $v_2$ is given by:

$$\text{SCORE}(v_1, v_2) = \frac{\langle v_1, v_2 \rangle}{|v_1|^2 + |v_2|^2 + T\sqrt{|v_1|^2 + |v_2|^2}} \bigg|_{0+} \quad (8)$$

where $\langle v_1, v_2 \rangle$ is the dot product between the vectors $v_1, v_2$, $|v|$ is the magnitude (modulus) of vector v, T is a characteristic activity threshold, and $|_{0+}$ denotes clipping of negative values to 0.

The SCORE metric is designed such that for approximately similar feature vectors (approximately aligned, and with similar magnitudes) of considerable magnitude (larger than T), it behaves like the SSIM metric, and attributes a high score (positive correlation evidence). However, unlike SSIM, if the vectors are anti-aligned (anti-correlation evidence), the score is kept to zero instead of being negative in order to be robust against matches of mirrored patches. Additionally, if at least one of the vector magnitudes is much less than the threshold T, the SCORE becomes very small. Hence SCORE does not get high values for accidental vector alignment (e.g. due to noise) if at least one of the vectors does not correspond to a perceptually meaningful feature. Large activity threshold T in equation (8) increases the robustness to noise, but it also decreases the SCORE grade for weak matching features. A tuning of T that is adaptive to both image content and the type of feature-vector used, is the mean of vector magnitudes in the feature vector map, for example multiplied by some factor close to 1 (e.g. 1.5).

For any two arbitrary columns (i.e. image strips according to the present invention), denoted $c_1$, $c_2$, a SCORE matrix is generated by calculating a SCORE value between every two point combination, according to:

$$\text{SCORE}_{c_1,c_2}(i,j) = \text{SCORE}(v_{c_1}(i), v_{c_2}(j)) \quad (9)$$

An exemplary SCORE matrix is illustrated in FIG. 7. As illustrated in FIG. 7, the SCORE matrix is a two-dimensional map of the correlation between each pixel feature vector in one image strip and each pixel feature vector in a corresponding image strip. In the particular example of FIG. 7, the horizontal axis of the SCORE matrix represents the position along image strip a of FIG. 6 and the position on the vertical axis represents the position along image strip b of FIG. 6.

The sample VP locator 358 [step 430] finds the similarity transformation parameters (s, τ) from the SCORE matrix as will be described below. While this process may be repeated for all possible pairs of image strips (which may comprise hundreds or even thousands of potential pairs), according to the preferred embodiment, it has been found that only a relatively small subset (for example between 50 and 150) of all possible column pairs need to be examined to find candidate VPs. In principle, any arrangement of image strips may be chosen and any pair of image strips may be correlated and many ways of positioning and correlating image strips will be apparent to the skilled person on reading the present description; trading off the number of pairs selected (more pairs leading to potentially higher accuracy) against processing overhead.

With regard to equation (9), if column $c_2$ is a perfect affine transformation of the column $c_1$, then $c_1(s \cdot i+\tau)=c_2(i)$, where s, τ are the transformation parameters. In the corresponding SCORE$c_1, c_2$ matrix, that relation would appear as high intensity areas (that correspond to strong matching points) spread along a straight fitted line 800, determined by the transformation parameters, as illustrated in the diagram in FIG. 8 (which is an enlarged version of FIG. 7). However, in practice, there is normally a large percentage of outliers due to accidental matches, occluding features and the like. Therefore, a robust line-fitting procedure is required. According to the present embodiment, the robustness of the line fitting is improved by incorporating a-priory assumptions. Global matches are preferred because perspective effects are global in the image. In other words, lines that pass through high SCORE points that are spatially distant are preferred (such as points 710 and 712 in FIGS. 7 and 8). Such global matches are also less sensitive to noise and digitization artifacts in low-resolution images. The line parameters can be derived by solving the following maximization problem:

$$[s, t] = \mathrm{argmax} \sum_i |i - CM| * SCORE(i, s \cdot i + \tau) \quad (10)$$

where $CM=\Sigma_i i \cdot SCORE(i, s \cdot i+\tau)$ is the centre of mass of the line, $SCORE(i, s \cdot i+\tau)$ is the linear interpolation of the SCORE matrix at the coordinates (i, s·i+τ) and |i−CM| is a term that linearly increases the significance in terms of weight of points distant from the centre of mass. A hierarchical exhaustive search may be used to solve that maximization problem, but other optimization methods could be applied as well.

Figure 8:
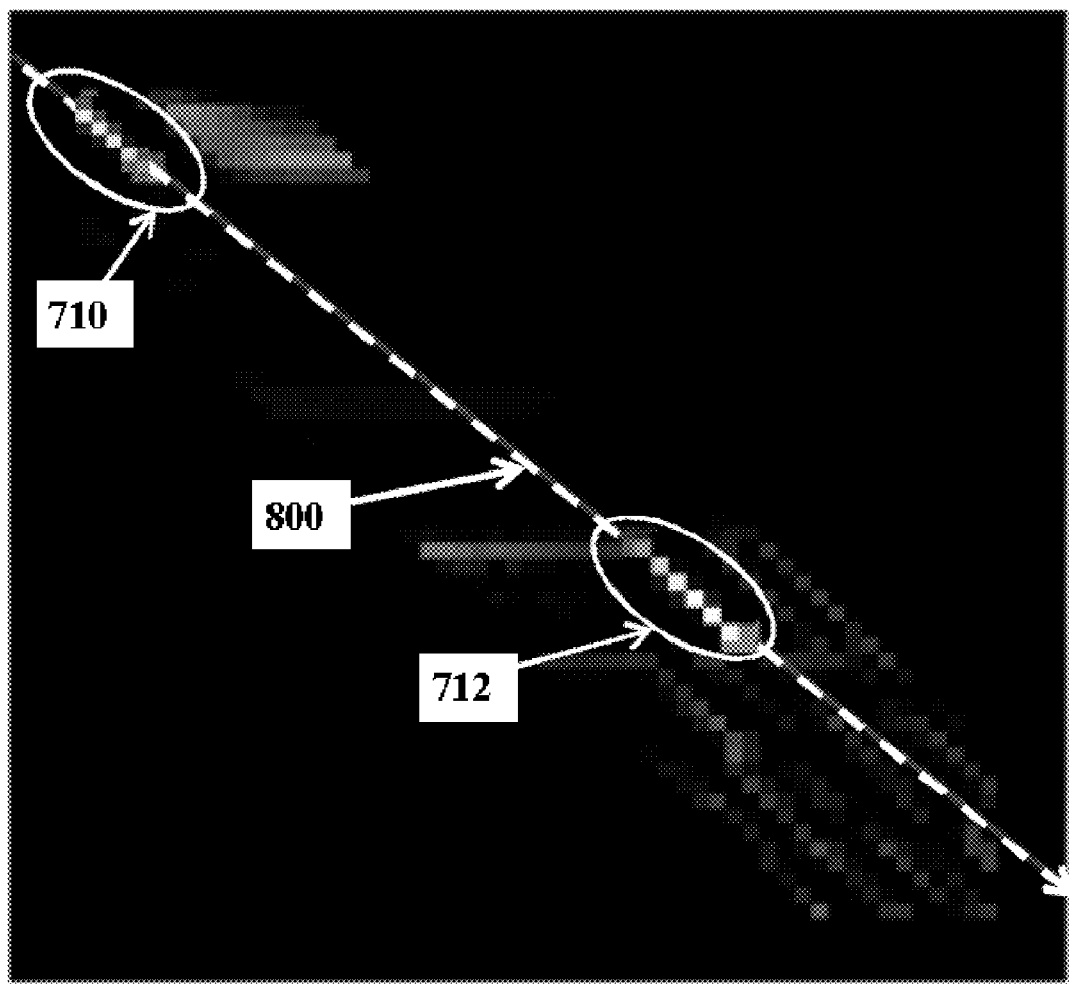
FIG. 8 shows a line of best fit for the SCORE matrix of FIG. 7.

As shown in FIG. 8, the similarity transformation parameters (s, τ) for the two correlated columns a and b are s=1.1675 and r=1.9273; and these values are substituted into the equations above to determine the VP in spatial coordinates (Eq. 4), or in the pencil-slope representation (Eqs. 5,6).

As already indicated, this correlation process is repeated by the sample VP locator 358 for all selected pairs of image strips to produce a plurality of candidate VPs.

In parallel with steps 420, 425 and 430 [steps 435, 440 and 445], the horizontal image strip processor 362 repeats the process (using the respective image strip positioner 364, image strip correlator 366 and sample VP locator 368) for finding candidate VP locations using horizontal image strips. In this instance, of course, the pixel context is a horizontal rectangle, rather than a vertical rectangle, around each pixel in the image strip.

Finally [step 450], when all candidate VP locations have been determined, the cluster processor 370 uses known accumulation and clustering techniques (such as a 'mean shift procedure; though others may be used) to determine the estimated VP locations and store the locations 316 on the image plane of the locations in the main memory 310.

In the present embodiment the accumulation and clustering step is performed in the pencil-slope representation by Equation (7), with two reference points (e.g. $x_o$ taken at the left and right boundaries of the image), in order to avoid the problem of mapping VPs near the reference point to infinity in pencil-slope space.

Any downstream image processor 380 can then operate on the original image data 312, using the estimated VP locations as required, for example for object placement.

Figure 9:
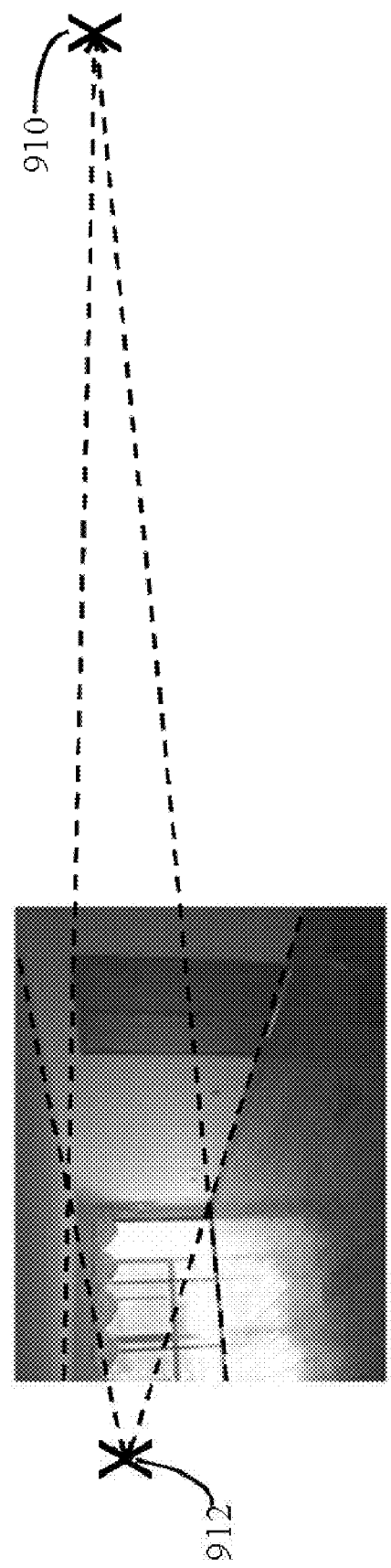

Using the aforementioned process, two VPs 910 and 912 are found (each marked with an "X") for the image in FIG. 5a, as illustrated in the reproduced image in FIG. 9.

An enhancement of the present embodiment is to, optionally, refine the estimation of VPs using a higher resolution version of the image (for example the original image, or a less downscaled version thereof). The refinement is done by choosing the most credible image strips that contributed to each found VP, and their best matching column pairs to re-enact the process in FIG. 4 (of course, excluding the downscaling and positioning the image strip steps) in higher resolution. In effect, the downscaled, lower resolution image is used for generating initial guesses for the step of line fitting in the SCORE matrix. Hence the computational cost of the refinement (compared with enacting the entire process using the higher resolution image) is kept relatively low.

Figure 10:
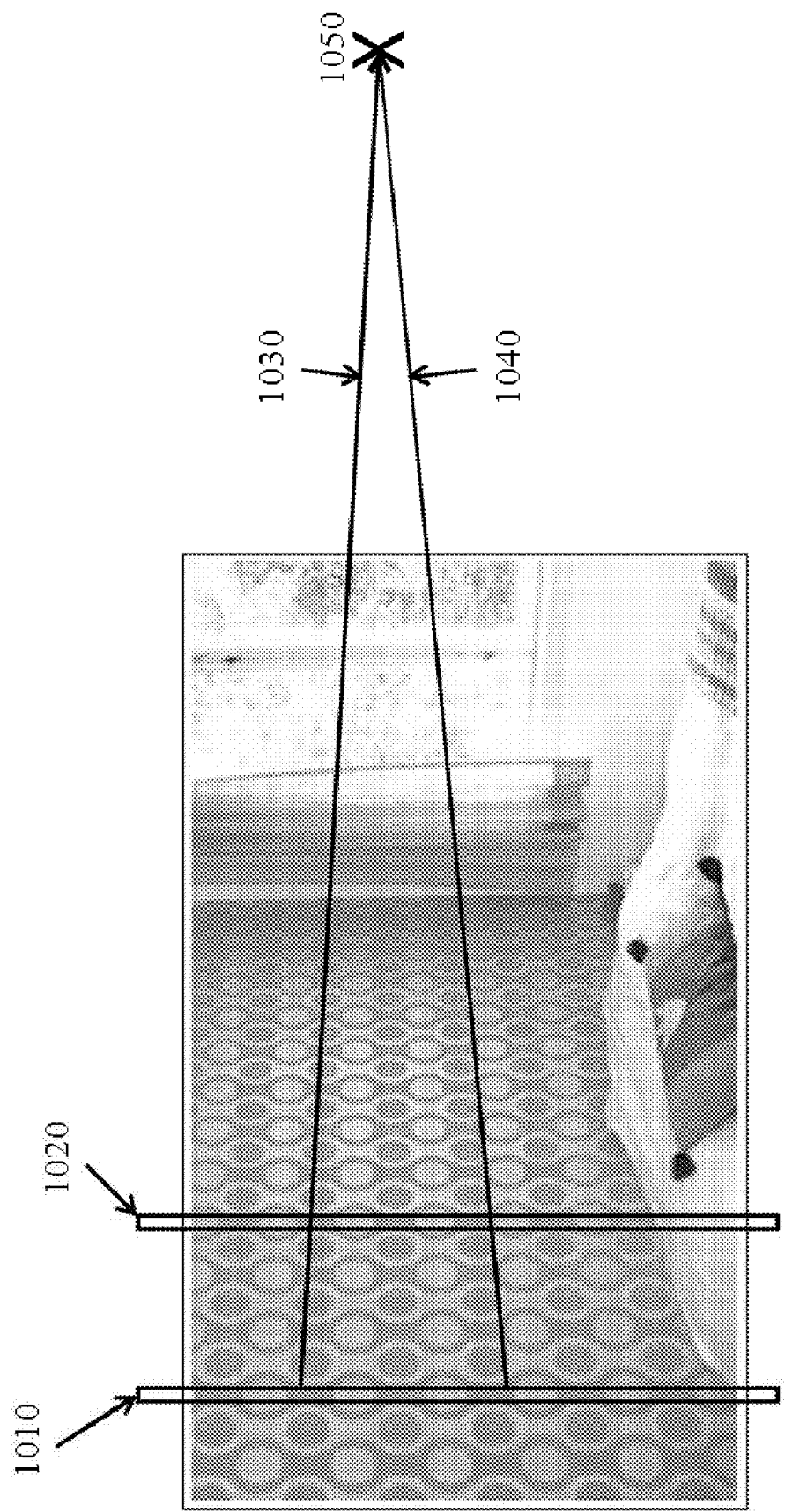
FIG. 10 is a digital image including superimposed thereon two image strips and illustrating how similar image patches can be used to determine as virtual straight line in the absence of derived in the absence of straight image features.

Advantages of embodiments of the present invention include the ability to operate reliably on low resolution images, thereby significantly increasing processing speed. In addition, the image conditioning steps (if applied) enable the process to perform well with low quality images (for example, small, blurred or poorly lit images). Significantly also, embodiments of the invention enable VP determination in scenes that do not contain explicit or detectable straight lines; whereas prior art processes rely on straight line detection. For example, embodiments of the invention can determine VPs based on regularly-textured planes, as illustrated by the image in FIG. 10, which includes regularly-textured wall covering in a room scene. In this example, two vertical image strips 1010 and 1020 are shown, and projection lines 1030 and 1040 passing through similar parts of the image strips to converge at a VP 1050. It has been found that embodiments of the present invention can also find VPs based on equally-spaced similar objects, such as trees, or on any combination of the foregoing options. Such flexibility (compared with the prior art which typically relies on only one kind of image feature, such as a line) is achieved by relying on the similarity between objects or features and the fact that their appearance, in terms of scale and displacement, depends on the perspective of the scene.

Figure 11:
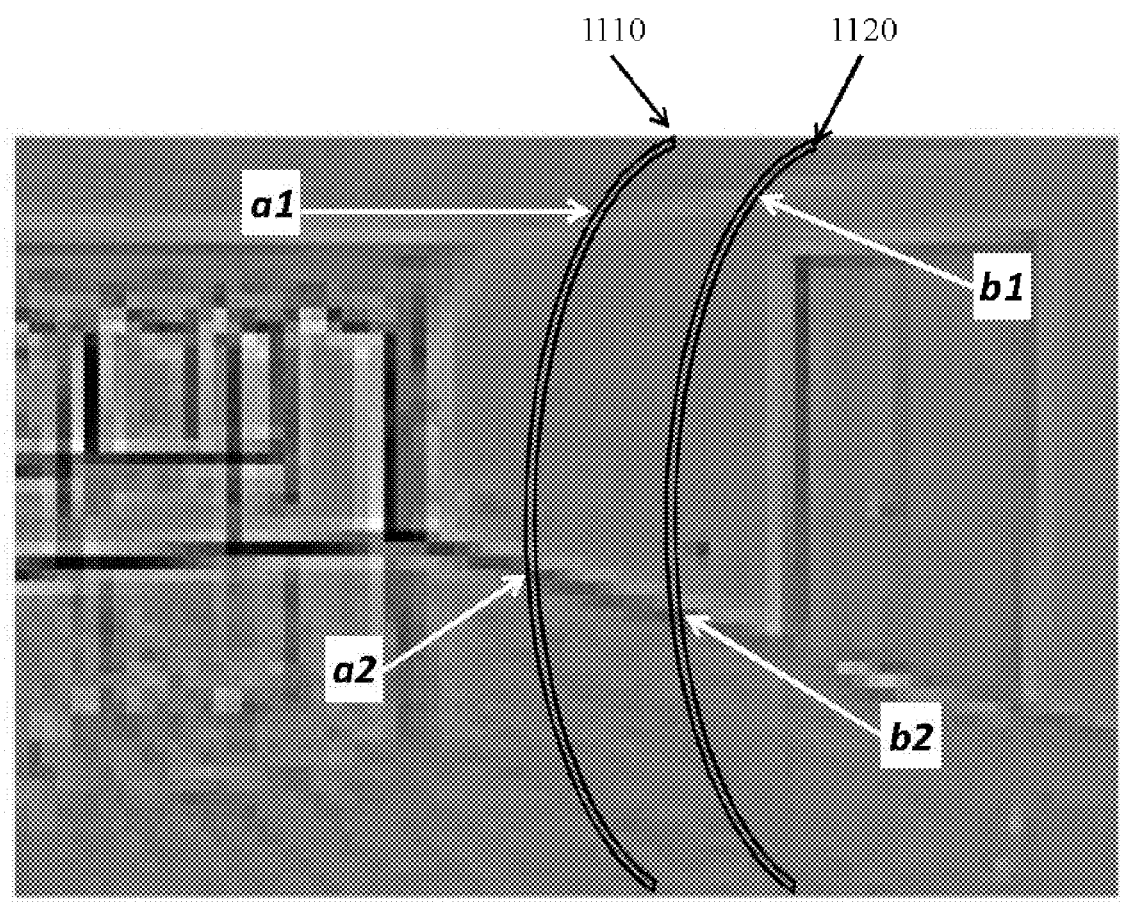
FIG. 11 is the same as FIG. 5b but including alternative exemplary image strips.

It will be appreciated that embodiments of the present invention are not limited to the image strips being straight, as illustrated in FIG. 11, in which the image strips 1110 and 1120 are curved. The points (a1, b1 & a2, b2) where the image strips cross with the image features remain the same (compared with FIG. 6).

The above embodiments are to be understood as illustrative examples of the invention. Further embodiments of the invention are envisaged. For example, other known or even new kinds of feature vector generation and correlation could be used for VP estimation purposes It is to be understood that any feature described in relation to any one embodiment may be used alone, or, if the context permits, in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. An automated image processor arranged to receive original digital image data and estimate the position of a vanishing point in an image plane of a respective original digital image, including by detecting pairs of similar image patches within an image and identifying a concurrent set of straight virtual lines that substantially converge at a point on the image plane, each line passing through a pair of similar image patches within the image.

2. The image processor of claim 1, wherein pairs of similar patches are detected by matching structural image features characterising the patches.

3. The image processor of claim 1, arranged to estimate the position of a vanishing point of an image by identifying a concurrent set of straight virtual lines that substantially converge at a point in the image plane, including outside of the image boundaries.

4. The image processor of claim 1, arranged to locate one or more pairs of image strips in the image and, for each pair of image strips, identify a candidate vanishing point by determining at least one set of concurrent straight virtual lines, each passing through an image patch in a first of the image strips and a similar image patch in a second of the image strips.

5. The image processor of claim 4, arranged to locate a plurality of pairs of image strips and a respective plurality of candidate vanishing points, and estimate the position of a vanishing point on the image plane by applying a clustering process to the plurality of vanishing point candidates.

6. The image processor of claim 4, arranged for each pair of image strips to estimate a one-dimensional affine transformation that maximizes the similarity between the image strips under an image strip similarity measure.

7. The image processor of claim 4, arranged for each pair of image strips to compare each image location within the first image strip with each image location within the second image strip to measure the structural similarity between the corresponding image patches.

8. The image processor of claim 7, arranged to generate for each image location to be compared a feature vector and attribute a similarity measure for each pair of image locations by computing a structural correlation evidence (SCORE) measure between the corresponding feature vectors.

9. The image processor of claim 8, wherein a SCORE measure attributes a high similarity score only to pairs of feature vectors that each have large magnitudes and are substantially aligned.

10. The image processor of claim 9, wherein the SCORE measures are collected into a two-dimensional SCORE matrix, in which each dimension represents the image locations of one image strip, and a straight line is fitted with respect to locations in the matrix representing SCORE measures having relatively high similarity values.

11. The image processor of claim 10, wherein slope and offset parameters of the fitted line determine the scaling and translation parameters of the best similarity transformation between respective image strips, in order to identify a candidate vanishing point for the respective pair of image strips.

12. The image processor of claim 11, wherein the line is fitted with respect to matrix locations having relatively high similarity values including by solving a maximisation problem, in which locations that are relatively more spatially distant in the matrix have a relatively increased significance in the maximisation problem.

13. The image processor of claim 6, wherein, for each pair of image strips, a vanishing point candidate is computed in the pencil slope coordinates from the affine transformation parameters according to Equations 5-7.

14. The image processor of claim 13, wherein the vanishing point candidates are clustered in a finite pencil-slope domain with reference to two different reference points, to estimate vanishing points located anywhere in the infinite image plane.

15. The image processor of claim 4, wherein the image strips have a relatively narrow elongated rectangular shape.

16. The image processor of claim 4, wherein the image strips in a pair are substantially parallel and spaced apart in the image.

17. The image processor of claim 5, wherein there are plural pairs of substantially vertical image strips.

18. The image processor of claim 5, wherein there are plural pairs of substantially horizontal image strips.

19. The image processor of claim 1, wherein the original digital image is first downscaled to generate a relatively low resolution version thereof, on which subsequent processing steps are carried out, whereby a vanishing point of the original digital image is estimated by first estimating a vanishing point of the low resolution version.

20. An image processor comprising:
   a. an input to receive digital data representing a digital image;
   b. a data store to store a received digital image; and
   c. a vanishing point estimator, which is adapted to estimate the position of a vanishing point in an image plane of a digital image, including by detecting pairs of similar image patches within an image and identifying a concurrent set of straight virtual lines that substantially converge at a point on the image plane, each line passing through a pair of similar image patches within the image.

21. An automated method of processing an image by estimating the position of a vanishing point in an image plane of a respective original digital image, including by detecting pairs of similar image patches within an image and identifying a concurrent set of straight virtual lines that substantially converge at a point on the image plane, each line passing through a pair of similar image patches within the image.

22. A non-transitory computer readable medium having stored thereon processing instructions which, when executed, enact an image processing method as claimed in claim 21.

23. The image processor of claim 1, wherein the detecting is based on comparisons of feature vectors respective characterizing the image patches.

* * * * *